United States Patent [19]

Heinzelmann

[11] Patent Number: 4,716,779
[45] Date of Patent: Jan. 5, 1988

[54] GEAR-SHIFT DEVICE

[75] Inventor: Karl-Fritz Heinzelmann, Meckenbeuren, Fed. Rep. of Germany

[73] Assignee: Zahnradfabrik Friedrichshafen AG, Friedrichshafen, Fed. Rep. of Germany

[21] Appl. No.: 902,408

[22] PCT Filed: Dec. 5, 1985

[86] PCT No.: PCT/EP85/00677

§ 371 Date: Aug. 18, 1986

§ 102(e) Date: Aug. 18, 1986

[87] PCT Pub. No.: WO86/03858

PCT Pub. Date: Jul. 3, 1986

[30] Foreign Application Priority Data

Dec. 22, 1984 [EP] European Pat. Off. .... 84/00429 LU

[51] Int. Cl.⁴ .............................................. G05G 9/12
[52] U.S. Cl. .................................................. 74/473 R
[58] Field of Search ................... 74/473 R, 475, 476, 74/477

[56] References Cited

U.S. PATENT DOCUMENTS 1,328,062  1/1920  Stewart .
2,489,735 11/1949  Zancan ................................ 74/476
4,228,693 10/1980  Kelbel ............................ 74/473 R X
4,466,305  8/1984  Hiraiwa et al. ................... 74/473 R
4,476,738 10/1984  Haga et al. ............................ 74/475

FOREIGN PATENT DOCUMENTS 2917774  2/1980  Fed. Rep. of Germany .
2935590  3/1981  Fed. Rep. of Germany .
1412745  8/1965  France .
2254060  7/1975  France .

Primary Examiner—Allan D. Herrmann
Attorney, Agent, or Firm—Karl F. Ross; Herbert Dubno; Ronald Lianides

[57] ABSTRACT

Gear-shift device for variable transmissions with shift dogs (6) in or on the gearing, which can be actuated from a manual shift lever, engage into shift rails (3) and displace these within limits, and with shift rocker arms (1) engaging in the recesses (31) of the shift rail (3) and actuating clutch sleeves (51) of the shifting couplings (5) over slide cranks (11). Between a shift rocker arm (1) and shift rail (3) a reversing lever (2) is provided, which reverses the actuation direction of the shifting coupling (5) in such a manner that the shift rail (3) and the clutch sleeve (51) are moved in the same direction although the support of the shift rocker arm (1) is arranged between the slide cranks (11) and the shift rails (3).

5 Claims, 4 Drawing Figures

GEAR-SHIFT DEVICE

FIELD OF THE INVENTION

The present invention relates to a gear-shift device for variable transmissions.

BACKGROUND OF THE INVENTION

According to their various utilizations, variable transmissions are developed for several gear ratios, for instance in a so-called hill-climbing speed type, wherein the highest speed has a gear ratio of 1.0, and, if chosen, also in a high-speed construction type with an overdrive and a gear ratio for instance of 0.79, for the highest speed. In order to build such variants, the gear-shift devices have to be adjusted. In the one case, for a direct transmission to the gearing at a gear ratio of 1, the clutch sleeve has to be shifted in direction toward the left, while in the other case it has to be shifted in the opposite direction. The shifting diagram for the driver, however, has to remain unchanged, and for this purpose, a reversal in the gear-shift device becomes necessary in the transmission.

It is known to support the shift rocking arm in question not like the other shift rocking arms, which are pivoted between the slide crank and the engagement point in the shift rail, within the housing, so that when actuated, a reversal in the direction of the clutch sleeve results, but to provide for the support of the shift rocking arm at one end thereof and to arrange the slide crank between the engagement point in the shift rail and this support point. As a result, in spite of the reversal in the clutch sleeve, with respect to the other clutch sleeves the shift direction for the driver, at the manual shift lever, stays the same. But it is not always possible to put into practice this relatively simple modification, because this way the required shift path for the clutch sleeve can not be achieved unless the support point for the shift rocking arm is located outside the transmission housing because of the length of the rocker arm.

Therefore, it is already known to use this type of a shift rocker arm and additionally to increase the shift path in the area of the shift rails.

In addition to two new swing bolts and a new considerably bigger shift rocking arm, the arrangements in the area of the shift rail are quite complicated in construction and assembly.

OBJECT OF THE INVENTION

It is therefore the object of the present invention to provide an improved gear-shift device in which the reversal of the direction of movement of the clutch sleeve with respect to the other clutch sleeves of the transmission can be achieved with simple means and, as a result, with reduced cost.

SUMMARY OF THE INVENTION

This object is attained by providing a simple reversing lever, which can even be manufactured by stamping, between the shift rail and a shift rocker arm, basically having the same size, the sought direction change is achieved, whereby the supports of the shift rocker arm also remain unchanged within the housing.

In a preferred embodiment, it is only necessary to provide next to the reversing lever one additional swing bolt in the housing and an entrainment pin between the shift rocker arm and the reversing lever, in order to achieve not only a reversal of the direction of movement of the clutch sleeve with respect to other sleeves of the transmission, but also a sufficient shift path for the clutch sleeve to actuate the shifting coupling. The simple entrainment pin on one of the parts is easy to manufacture and, in certain cases can be even shaped from the reversing lever, for instance by non-cutting forming. If the support of the reversing lever on a pivot bolt is done through a fork, which is formed at an end of the reversing lever, this is not only very simple, but also produces a motion of sufficient length to shift gears.

A gear-shift device is known from German Pat. No. 29 35 590, wherein for the reversal of the shift lever motion at one speed a reversing lever is provided, so that with each gearshift bar in each direction one speed can be shifted, although in the shifting diagram they are arranged in the same direction. In this gear-shift device, in principle, for the shifting of the gears only shift forks are displaced, there are no shift rocker arms and the reversing lever is, as known, centrally and rotatably supported.

BRIEF DESCRIPTION OF THE DRAWING

Further details of the invention are described with the aid of embodiment examples shown in the drawing, in which:

FIG. 4 is a detail of FIG. 2 showing a formed entrainment pin on a rocker arm.

SPECIFIC DESCRIPTION

Figure 1:
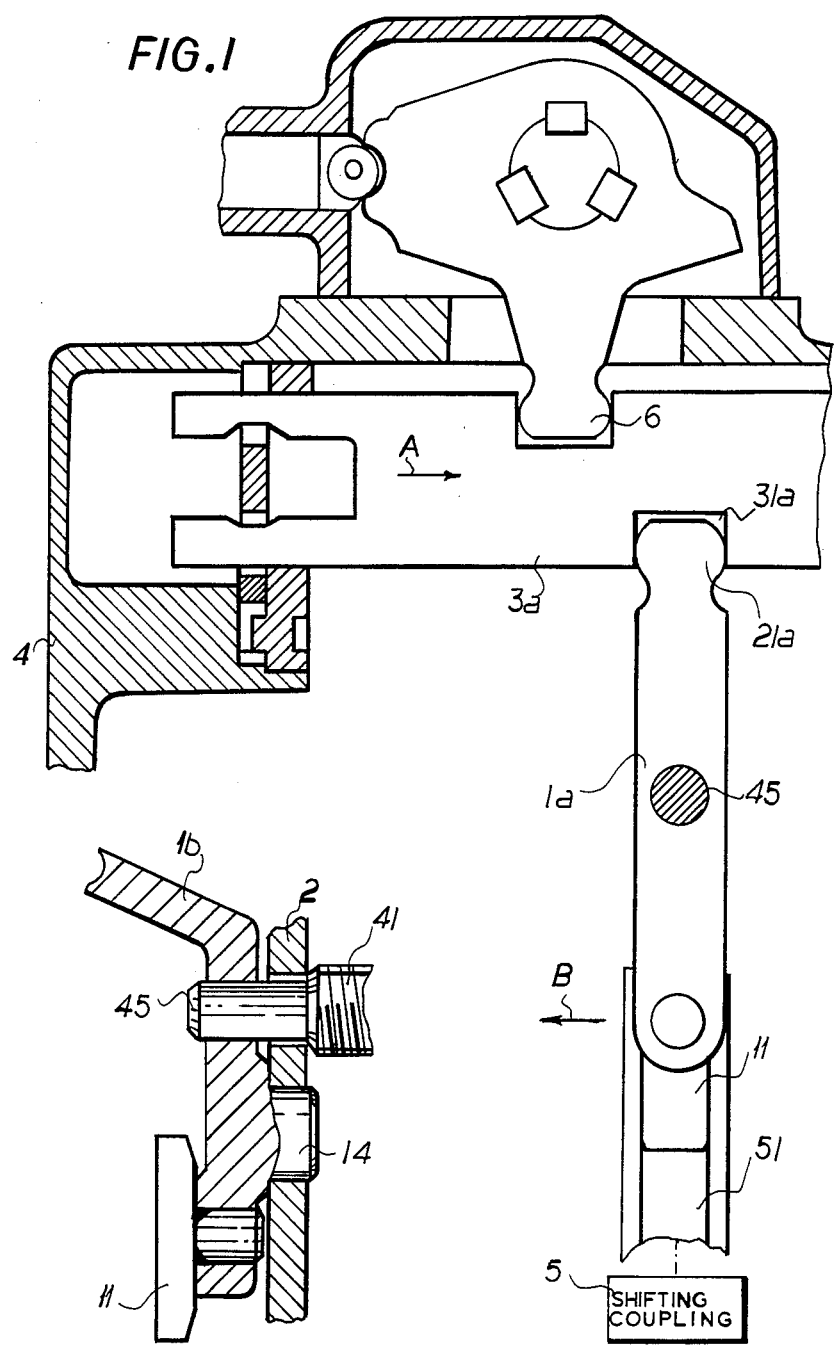
FIG. 1 is a partial longitudinal section through the transmission in the area of the shifting coupling according to the invention.
Figure 2:
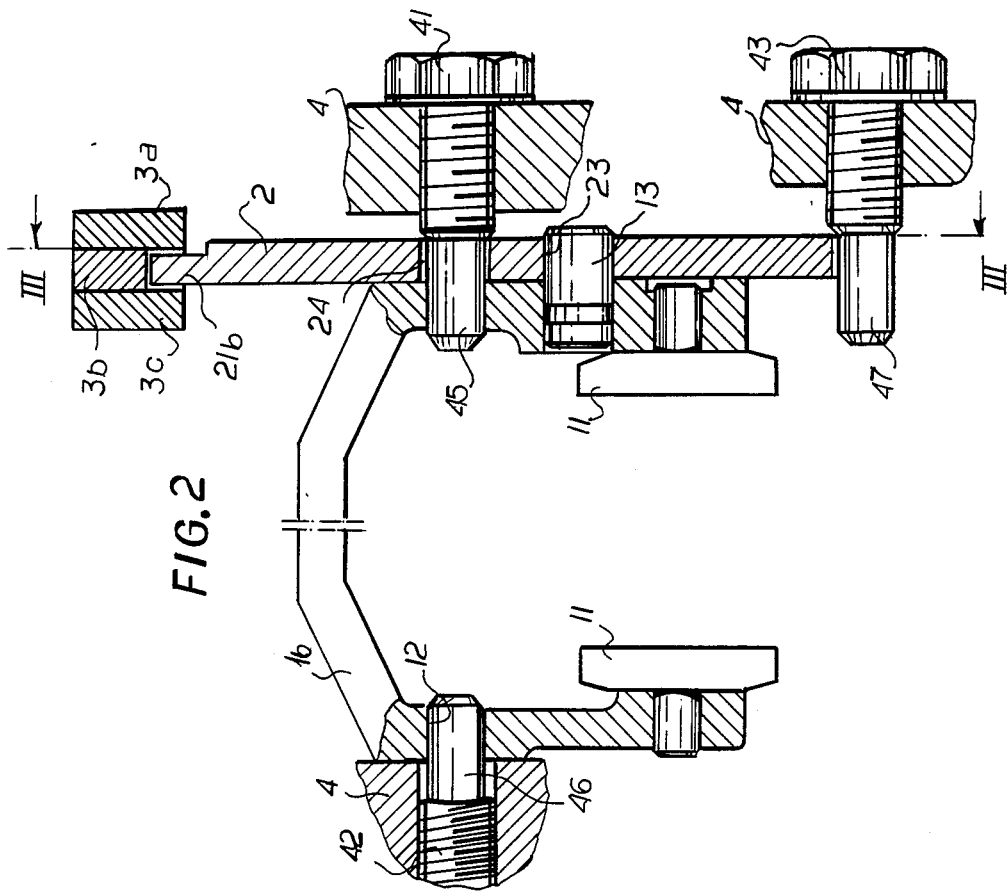
FIG. 2 is a partial cross section through the transmission in the area of the shift rocker arm of the reversing lever and of the shift rail.
Figure 3:
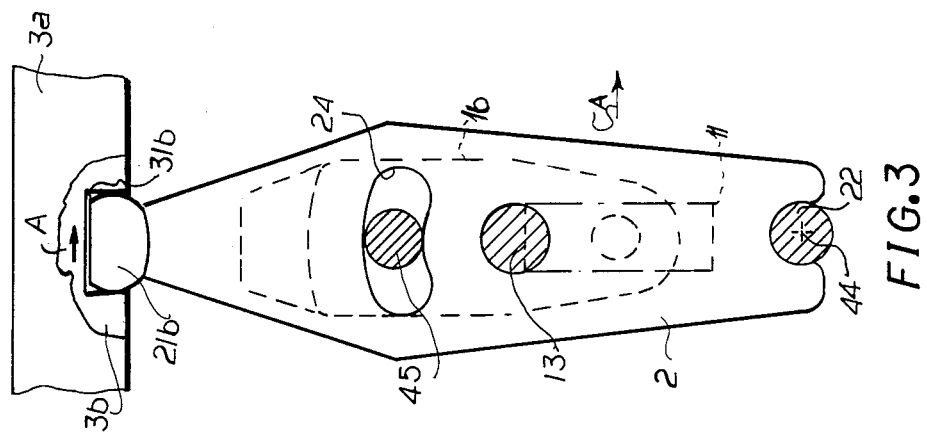
FIG. 3 is a section taken along line III—III, of FIG. 2.

In FIG. 1, a transmission housing 4 is provided with shifting means including a shift finger 6 engaging a shift rail 3a, one of three of three shift rails 3a, 3b and 3c engageable by the shifting means and arranged adjacent one another as seen more clearly in FIGS. 2 and 3 and which are formed with respective recesses engageable by respective rocker arms or reversing levers positioned at different locations. In FIG. 1, the recess 31a is engaged by the head 21a of a rocker arm 1a formed with bores 12 which are pivotally mounted at one side on the pin portion 45 of a swing bolt 41 mounted on housing 4 and on the other side by pin portion 46 of bolt 42, also mounted on housing 4. The arm 1a is further provided with slide cranks 11 engaged in a clutch sleeve 51 of the respective shifting coupling 5 of this particular gear ratio.

In FIGS. 2 and 3, the rocker arm 1b does not engage a shift rail directly but instead is pivotally connected to a reversing lever 2 by an entrainment pin 13 seated in the arm 1b and extending into a bore 23 in lever 2, the reversing lever 2 being formed at the upper end with a head 21b engaging in the recess 31b of shift rail 3b and at the lower end with a yoke 22 by which the lever 2 is swingingly supported about a pivot point 44 by the pin portion 47 of a pivot bolt 43 mounted on housing 4. The reversing lever 2 is further formed with an opening 24 for the passage of the pin portion 45 of the swing bolt 41 which supports the arm 1b, the opening being dimensioned so that upon swinging of the lever 2 by displacement of the rail 3b, the lever 2 can swing within given limits without impediment.

In FIG. 4, the entrainment pin 13 is replaced by an entrainment pin 14 formed unitary with the rocker arm 1b, but in all other respects the gear-shift device is the same both structurally and operationally.

In the operation of the gear-shift device at the transmission location illustrated in FIG. 1, the shift finger 6 of the shifting means displaces the shift rail 3a in the direction, by way of example, of arrow A, which causes the rocker arm 1a engaged thereby to rotate clockwise about the pin 45, which in turn causes the displacement, by the slide 11, of the clutch sleeve 51 of the shifting coupling 5 in the direction of arrow B, opposite to that of arrow A.

In the operation of the gear-shift device at the transmission location illustrated in FIGS. 2 and 3, again by way of example, the shift rail 3b is displaced in the direction of arrow A, which causes the reversing lever 2 to swing clockwise around the rotation point 44, within the limits of opening 24, and by way of entrainment pin 13 engaging both the lever 2 and rocker arm 1b, the slide 11 is displaced also in the direction of arrow A, thereby reversing the direction of actuation of this particular shifting coupling with respect to the other shifting couplings of the transmission with the same direction of displacement of the shift rail 3b as the other respective shift rails 3a and 3c.

Reference Numerals 1 shift rocker arm
11 slide crank
12 bore for swing bolt
13 entrainment pin
14 pin
2 reversing lever
21 reversing lever knob
22 bearing yoke
23 bore
24 opening
3 shift rail
31 recess
4 transmission housing
41 swing bolt
42 swing bolt
43 swing bolt
44 rotation point
45 pin
46 pin
47 pin
5 shifting coupling
51 clutch sleeve
6 shift dog

We claim:

1. Gear-shift device for variable speed transmission comprising:
   a transmission housing;
   shifting means including at least one shift finger mounted in said transmission housing;
   a plurality of shift rails disposed in said transmission housing and selectively engageable by said shifting means for displacing a respective rail within given limits;
   a respective shift-rocker arm engaged with each shift rail;
   a respective slide crank connected to each shift-rocker arm and engageable in a clutch sleeve of a respective shifting coupling for speed selection upon displacement of the respective rail; and
   a reversing lever connected between one of said rocker arms and the respective one of said rails for reversing the direction of actuation of the respective shifting coupling with respect to the direction of actuation of others of said shifting couplings whereby said one of said rails and the respective clutch sleeve are both displaced in the same direction.

2. The gear-shift device defined in claim 1 wherein said reversing lever is rotatably connected to said one rocker arm and swingably supported at one end on said transmission housing, the other end of said reversing lever engaging in a recess formed in said one rail, said reversing lever being formed with an opening for the passage of a swing bolt mounted on said housing and supporting said one rocker arm, said opening being so dimensioned whereby upon actuation of said reversing lever by said one rail, said reversing lever can swing within said given limits without impediment.

3. The gear-shift device defined in claim 2 wherein said reversing lever is rotatably connected to said one rocker arm by an entrainment pin mounted on said lever or said arm.

4. The gear-shift device defined in claim 2 wherein said reversing lever is rotatably connected to said one rocker arm by an entrainment pin formed on said lever or said arm.

5. The gear-shift device defined in claim 2 wherein said one end of said reversing lever is formed with a bearing yoke swingably supported by a pivot pin mounted on said housing.

* * * * *